Sept. 16, 1941. M. E. DEAN 2,256,142
VEHICLE FLAG SUPPORT
Filed Sept. 14, 1940
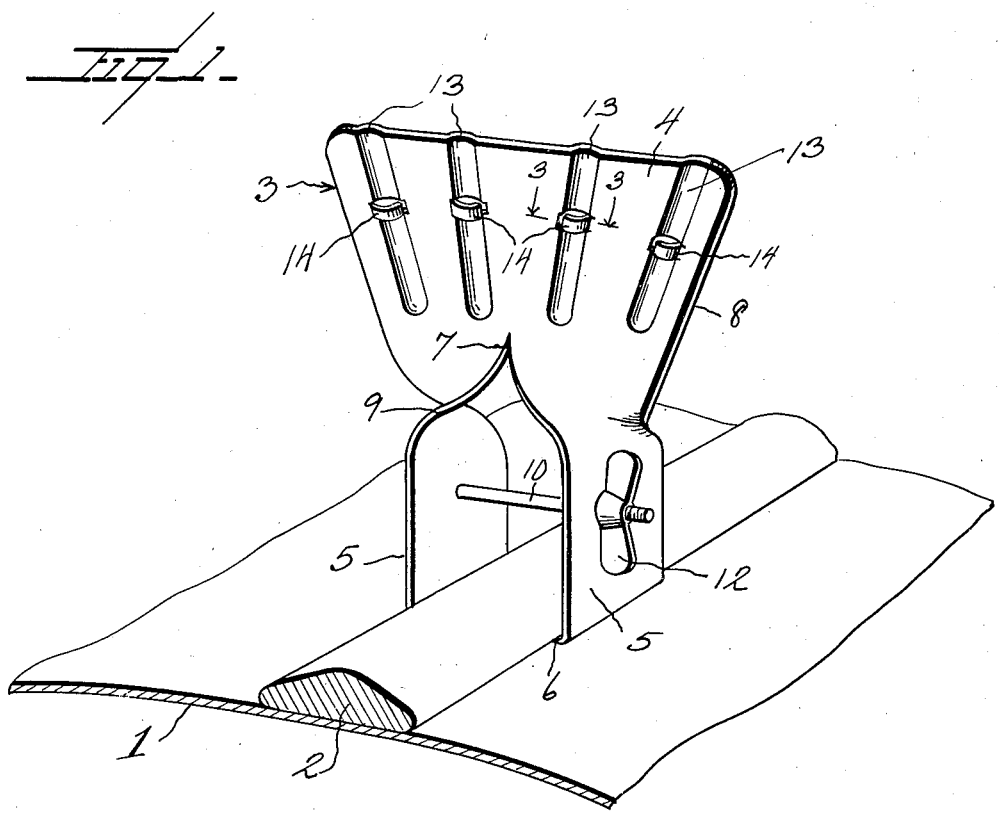
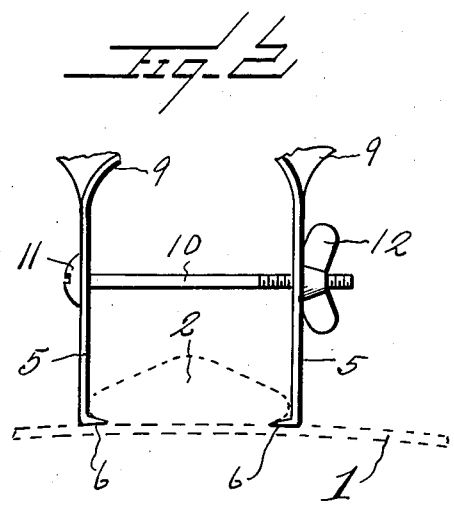
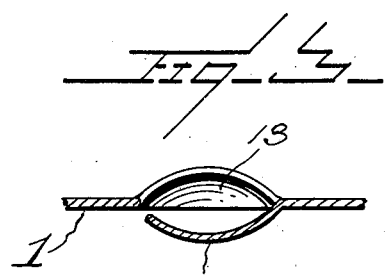
Inventor
Marvin E. Dean
By Watson E. Coleman
Attorney Patented Sept. 16, 1941

2,256,142

UNITED STATES PATENT OFFICE 2,256,142

VEHICLE FLAG SUPPORT

Marvin E. Dean, Collinsville, Ill.

Application September 14, 1940, Serial No. 356,851

4 Claims. (Cl. 248—39)

This invention relates to display fixtures or article supporting devices designed to be mounted upon motor vehicles and pertains particularly to an improved device of this kind for supporting a number of flags.

The principal object of the present invention is to provide an automobile flag holder which is constructed of a single piece of material in a novel manner which facilitates its easy and firm attachment to the middle bead or molding which forms a part of the hood of motor vehicle bodies.

Another object of the invention is to provide a flag holding device for motor vehicles which is shaped from a single sheet of metal and which provides a pair of clamping legs adapted to engage the bead or molding running lengthwise of the top of the vehicle hood and a vertical portion against a face of which the staffs of a number of flags may be secured, the securing means for the flag staffs being shaped directly from the metal sheet.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view in perspective of the device embodying the present invention, showing the same applied.

Fig. 2 is a view in front elevation of the lower part of the device.

Fig. 3 is a section on the line 3—3 of Fig. 1.

Referring now more particularly to the drawing, the numeral 1 designates a portion of the hood of a motor vehicle along the top of which extends the usual bead strip 2. The device embodying the present invention is shown applied to this bead strip and is indicated as a whole by the numeral 3. This device is stamped from a single body or piece of sheet metal and comprises an upper plate portion 4 and two leg portions 5, which are arranged in spaced parallel relation and each of which at its free end has an inturned jaw flange 6, which is intended to engage beneath an edge of the molding strip or bead 2.

It will be readily apparent that in forming the legs 5, the body of sheet metal 3 is split from one edge along substantially a center line, the split being indicated at 7, thus dividing the plate through a portion of its height into two elongated parts, the side edges of the plate being tapered inwardly from the top edge, as indicated at 8, so that the two parts which are finally shaped to form the legs 5, are relatively narrow.

After splitting the plate in the manner stated, the two parts thus formed are torsionally twisted, as at 9, so as to produce the two legs with their wide faces in spaced opposed relation.

The legs are provided with suitable apertures through which is extended a bolt 10, one end of the bolt having a head 11 to hold it in position against the adjacent leg while the other end of the bolt is screw threaded to receive the wing nut 12, which when threaded up on the bolt, bears against the outer side of the adjacent leg and, through the bolt, draws the two legs toward one another. By this means, the bead of the hood is secured between the jaw edges 6 of the legs and thus the plate 4 is held in vertical position in a plane extending transversely of the bead.

The plate portion 4 of the holder is provided with the several pressed channels 13 which extend from the top edge of the plate in downwardly convergent relation and which are designed to cradle the lower ends of flag staffs, not shown.

Across each of the channels 13 there is stamped out a tongue 14, one end of which is free, as shown, and the body portion of which is bowed lengthwise to form in cooperation with the adjacent channel, substantially a circular area in which the flag staff may position. Thus it will be seen that when a flag staff is placed in a channel 13 and forced under the tongue 14 extending across that channel, it will be firmly held in the desired position and the device will function to support a display of flags in the desired position.

From the foregoing, it will be readily apparent that the device herein disclosed, while of simple design, provides a sturdy and efficient means of mounting a display of flags upon the hood of a motor vehicle, and it will also be apparent that with this device, such a display can be set up without having to drill any holes in the body of the car or making other changes therein, and that the device may be readily applied and removed without damaging the beading or the car finish.

What is claimed is:

1. A display fixture of the character described, comprising as a unitary structure a plate body having a pair of resilient legs forming integral extensions of an edge thereof, said legs having a substantial width extending perpendicularly to the width of the plate body, means forming a part of the plate body for securing thereto an article for display, means connecting said legs together facilitating drawing the same together, and means at the free ends of the legs forming opposing gripping jaws.

2. A display device of the character stated, comprising a body of sheet metal cut inwardly from one edge to form two portions, said portions being torsionally twisted to provide a pair of relatively broad legs in spaced parallel relation with the broad sides thereof opposed, said legs at the free edges thereof having inturned flanges forming gripping jaws, means for drawing said legs together, and means forming a part of the body above the legs facilitating the attachment of a staff thereto.

3. A display device of the character stated, comprising a body of sheet metal cut inwardly from one edge to form two portions, said portions being torsionally twisted to provide a pair of relatively broad legs in spaced parallel relation with the broad sides thereof opposed, said legs at the free edges thereof having inturned flanges forming gripping jaws, means for drawing said legs together, and means forming a part of the body above the legs facilitating the attachment of a flag staff thereto, said means comprising a resilient tongue struck out from the sheet metal body and having a portion bowed outwardly from the adjacent face of the body to facilitate the insertion of a flag staff between the tongue and the body.

4. A flag holder of the character described, comprising a body of sheet metal having a relatively wide top edge and having downwardly converging side edges, the sheet metal body being split centrally from its lower edge toward its top edge to provide two portions, said portions being torsionally twisted to bring the wide faces into opposed relation and to form supporting legs, said legs at their free ends having transversely extending inturned flanges forming gripping jaws, coupling means between the legs facilitating drawing the legs together, the body above the legs having tongues pressed therefrom and longitudinally bowed, and the body further having channels pressed therein and extending from the said top edge in downwardly convergent relation, each of said channels having the bowed portion of a tongue extending thereacross.

MARVIN E. DEAN.